April 15, 1952     M. C. MERCER     2,592,720

ICE-CREAM SCOOP

Filed Sept. 20, 1949

INVENTOR.

MARY CAROLINE MERCER

BY

*ATTORNEYS*

Patented Apr. 15, 1952

2,592,720

UNITED STATES PATENT OFFICE 2,592,720

ICE-CREAM SCOOP

Mary Caroline Mercer, Midwest, Wyo.

Application September 20, 1949, Serial No. 116,730

2 Claims. (Cl. 107—48)

This invention relates to an ice cream scoop, and more particularly to an ice cream scoop for dispensing the ice cream in the shape of a pie sector.

It is an object of this invention to provide an ice cream scoop of the kind to be more particularly described hereinafter having a sector shaped scoop portion and a blade swingable in the scoop for cleaning the ice cream from the scoop to be placed on a piece of pie.

Another object of this invention is to provide an ice cream scoop of this kind having sectional handle grips pivoted together to be rocked from an open to a closed position for dispensing the ice cream and spring pressed to an open position for holding while scooping the ice cream from the container.

Still another object of this invention is to provide a device of this kind which is pleasing in appearance, compact in arrangement and simple to operate for dispensing ice cream in sector shapes for use as pie à la mode on pieces of pie.

A further object of this invention is to provide a device of this kind having only two movable parts pivotally connected together. Each of the parts will be formed in a conventional manner by stamping, casting, or any other suitable manner and secured together in operative relation by a single pivot pin. A spring about the pivot pin will be engaged in a concealed manner within the handle portions of the device in a manner to provide the pleasant appearance and to hold the ends of the spring from injuring the fingers and hands of the operator.

With the above and other objects in view, my invention consists in the arrangement, combination and details of construction disclosed in the drawings and specification, and then more particularly pointed out in the appended claims.

Figure 1:
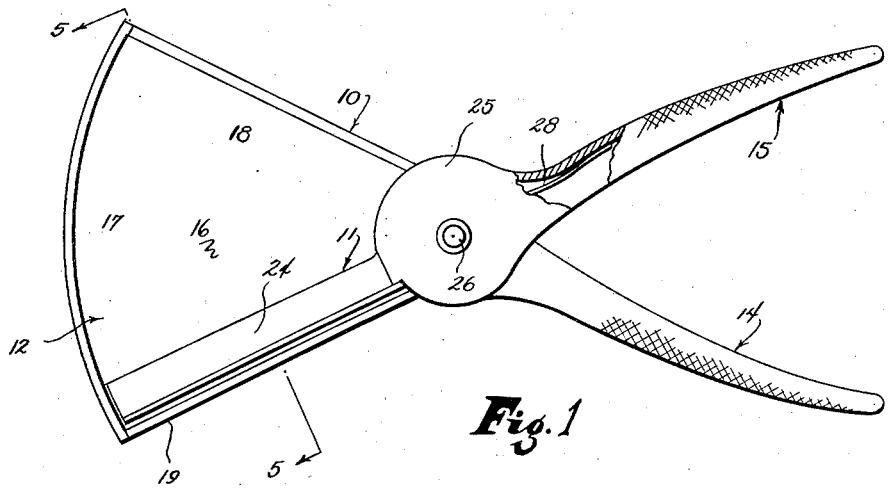
Figure 1 is a top plan view, partly broken away and partly in section, of an ice cream scoop formed according to an embodiment of my invention.
Figure 2:
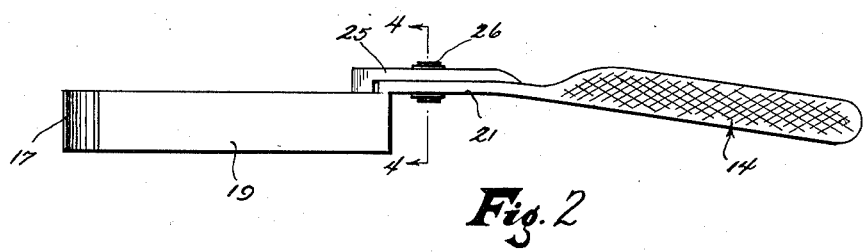
Figure 2 is a side elevation.
Figure 3:
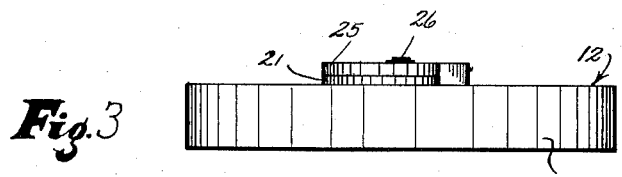
Figure 3 is a front end view.
Figure 4:
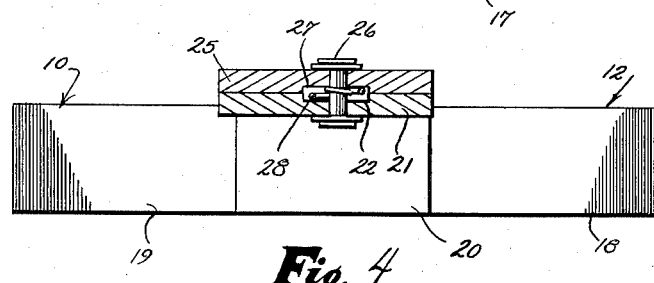
Figure 4 is a transverse section taken on the line 4—4 of Figure 2.
Figure 5:
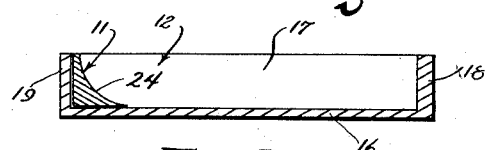
Figure 5 is a transverse section taken on the line 5—5 of Figure 1.

Referring to the drawings, the numeral 10 designates generally an ice cream scoop constructed according to an embodiment of my invention, for scooping ice cream from a container. The scoop 10 is sector-shaped so the shape of the ice cream will conform to the shape of a conventional sector-shaped piece of pie when the ice cream is to be placed on the pie for pie à la mode. A scraper 11 is pivotally carried by the scoop 10 for removing the ice cream in such a manner that the shaped ice cream will not be distorted upon removal from the scoop. Both the chamber 12 and the scraper blade 11 are formed with handles 14 and 15, respectively, for moving the scraper blade 11 across the chamber 12 when it is desired to dispense the ice cream.

The chamber 12 on the scoop 10 is formed with a sector shape, flat bottom wall 16, an arcuate front wall or flange 17 on the front end of the bottom wall and extending substantially perpendicularly from one side of the bottom wall, and a pair of side walls 18 and 19 extending one along each side edge of the bottom wall and projecting perpendicularly from the side of the bottom wall from which said front wall projects. The side walls are joined at corresponding ends to respectively opposite ends of the front wall 17 and converge toward the rear end of the sector chamber 12 being spaced apart at their extreme rear ends, as clearly shown in Figure 1 of the drawings. A short rear wall 20 is fixed between the rear ends of the side walls 18 and 19, closing the marginal flange about the chamber 12.

A connecting disc or plate 21 is formed integrally with the rear wall 20 at the upper edge and extends rearwardly perpendicular thereto. The handle 14 is of channel shaped cross section and is formed on the rear end of the disc 21 and extends from the disc in a direction away from the scoop chamber 12 substantially parallel to the side wall 18 of the chamber. An upwardly-opening groove or channel 22 is formed on the upper surface of the plate 21 and opens at the rear end thereof in longitudinal alignment with the interior of the channel shaped handle 14.

The scraper 11 includes an elongated blade substantially L-shaped in cross-section having flat sides disposed at right angles to each other and a concave face 24 between the flat sides thereof. One flat side of the scraper 11 is substantially perpendicular to the bottom wall 16 and will normally abut the inner surface of the side wall 19 of the chamber 12, while the other flat side of the scraper blade is substantially parallel to and slidably engages the upper surface of the bottom wall 16 and the scraper blade extends longitudinally from the rear wall 20 to the front wall 17 of the chamber 12. In this manner the concave face 24 will normally face the opposite side wall 18 of the chamber and sliding of the blade 11 from the side wall 19 to the opposite side wall 18 along the bottom wall 16 will lift the ice cream in the chamber 12 from the bottom wall and, upon inverting the scoop, the ice cream will fall out of the chamber 12 onto a piece of pie placed therebelow.

A bearing plate or disc 25 extends from the end of the scraper blade 11 adjacent the rear wall 20 of the chamber 12 and overlies the disc 21. The discs 21 and 25 are provided with registering apertures and a pivot pin 26 extending through these apertures interconnects the discs for pivotal movement relative to each other. A downwardly open groove or recess 27 is formed in the lower side of the disc 25 confronting the recess 22 of the plate 21 and encircling the pivot pin 26. The handle 15 of channel shaped cross section is joined at one end to the disc 25 and extends from the disc in a direction away from the scraper blade 11. The groove 27 opens at its rear end in alignment with the interior of the channel shaped handle 15.

A wire spring 28 is coiled about the pivot pin 26. One end of the spring is extended partly along the length of one handle and the other end of the spring is extended partly along the length of the other handle for normally biasing the handles 14 and 15 divergently apart and the scraper blade 11 to one side of the chamber 12.

In the use and operation of the ice cream scoop 10 the spring 28 normally biases the handles 14 and 15 apart and the scraper to one side of the chamber 12. By grasping the divergent handles an operator may fill the chamber 12 with ice cream by scraping the edges of the side walls at the open side of the chamber against an edge of the container carrying the ice cream. The scoop 10 is then inverted over a piece of pie and by manually compressing the handles the operator will cause the scraper blade 11 to slide across the bottom wall 16 of the chamber 12 to loosen the ice cream which will then fall from the scoop 10.

I do not mean to confine myself to the exact details of construction herein disclosed, but claim all variations falling within the purview of the appended claims.

I claim:

1. An ice cream scoop comprising a pair of members pivotally interconnected intermediate their length for angular movement relative to each other, one of said members including a handle at one side of the pivotal connection between said members and at the other side of said pivotal connection a body formation having a flat bottom wall of sector shape, a curved front wall extending along the wider end of said bottom wall, side walls extending one along each side of said bottom wall and mutually converging in a direction away from said front wall, and a rear wall extending between the ends of said side walls remote from said front wall, said side walls and said rear wall extending substantially perpendicularly from the same side of said bottom wall and providing with the latter a sector shaped ice cream receiving chamber, and the other of said members including a handle at one side of said pivotal connection opposed to the first mentioned handle, and at the other side of said pivotal connection a scraper blade extending from the rear wall to the front wall of said body formation and having a flat side slidably engaging the adjacent surface of said bottom wall, and spring means acting between said handle resiliently urging said scraper blade against one of said side walls, said blade being movable across said bottom wall to the other side wall by manual compression of said handles.

2. An ice cream scoop comprising a pair of members pivotally interconnected intermediate their length for angular movement relative to each other, one of said members including a handle at one side of the pivotal connection between said members and at the other side of said pivotal connection a formation providing a sector shaped chamber having a flat bottom wall and side walls one of which is disposed substantially in longitudinal alignment with said handle, and the other of which members includes a handle at one side of said pivotal connection and opposed to the first mentioned handle, and at the other side of said pivotal connection a scraper blade disposed substantially in longitudinal alignment with the handle of said other member and received in said chamber in sliding engagement with the bottom wall of the latter, and spring means acting between said handles resiliently urging said scraper blade against the other side wall of said chamber, said scraper blade being movable across said bottom wall from said other to said one side wall by manual compression of said handles.

MARY CAROLINE MERCER.

REFERENCES CITED

The following references are of record in the file of this patent:

UNITED STATES PATENTS

| Number | Name | Date |
|---|---|---|
| D. 91,697 | Bailie | Mar. 13, 1934 |
| 980,628 | Gilchrist | Jan. 3, 1911 |
| 1,769,218 | Garvis | July 1, 1930 |